Figure 1:
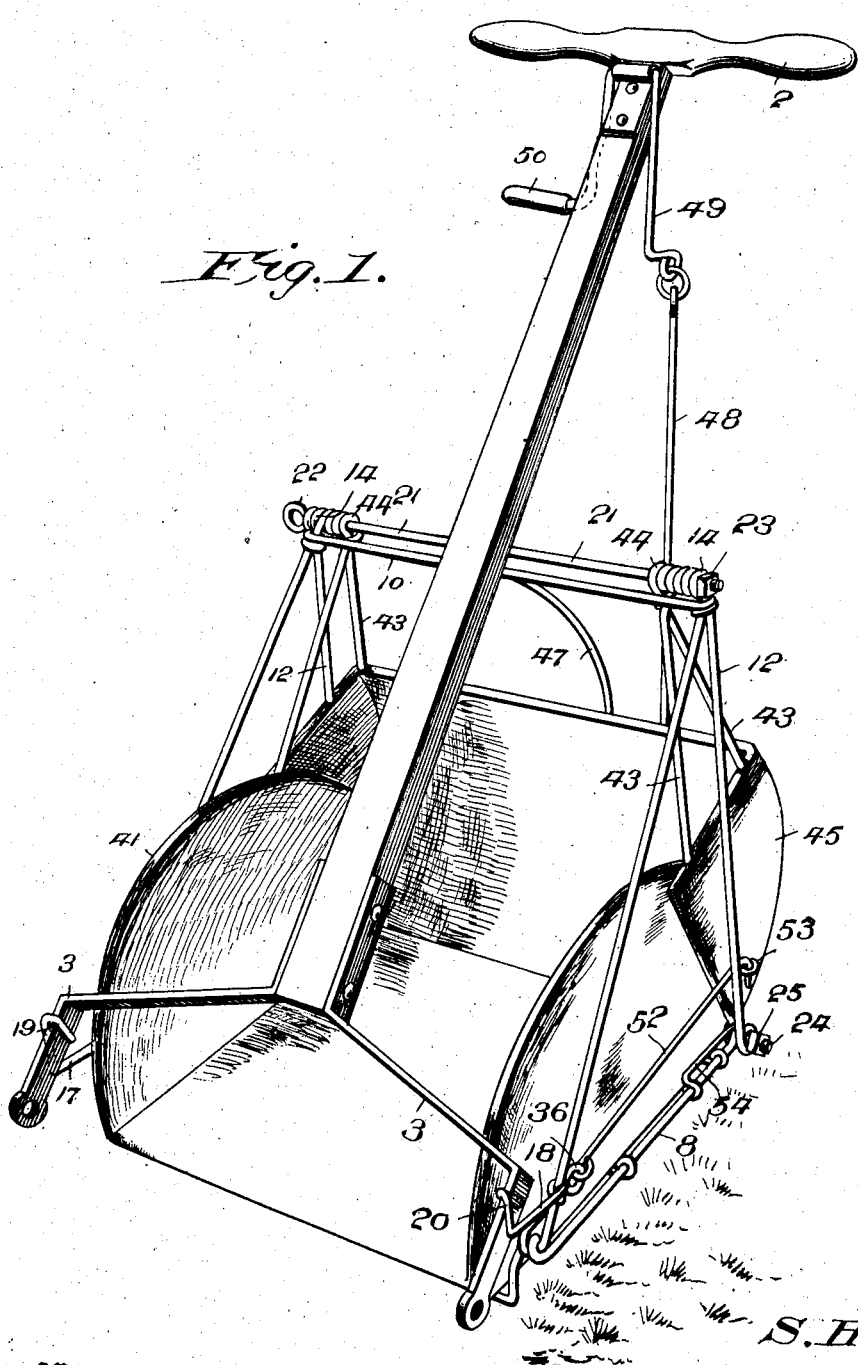

No. 834,615. PATENTED OCT. 30, 1906.
S. HADAC.
GRASS GATHERER.
APPLICATION FILED APR. 11, 1906.

3 SHEETS—SHEET 1.

Witnesses

Inventor
S. Hadac

By
W. J. FitzGerald
Attorneys

No. 834,615. PATENTED OCT. 30, 1906.
S. HADAC.
GRASS GATHERER.
APPLICATION FILED APR. 11, 1906.
3 SHEETS—SHEET 2.
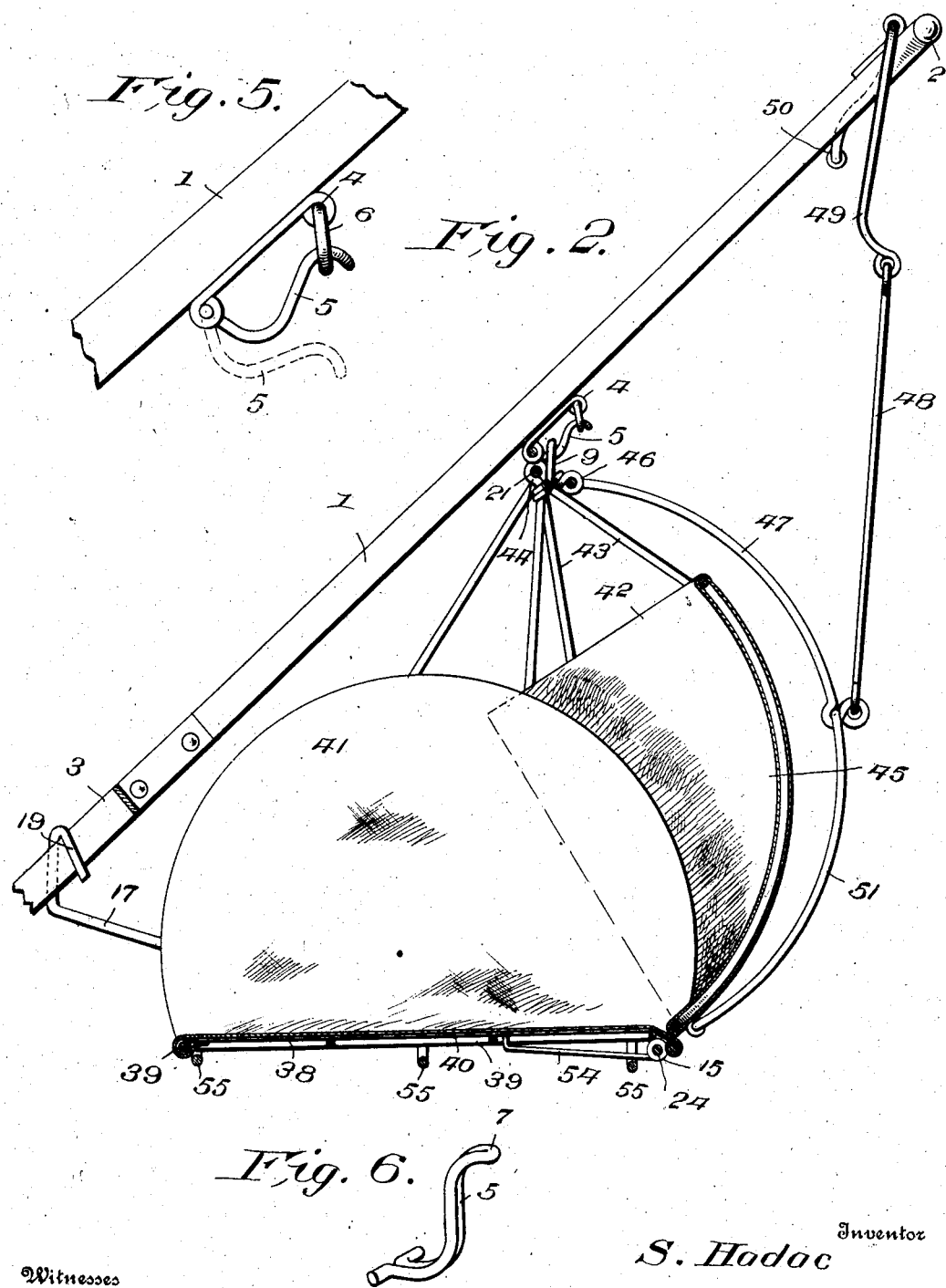
Witnesses
Inventor
S. Hadac
By
W. J. FitzGerald
Attorneys No. 834,615. PATENTED OCT. 30, 1906.
S. HADAC.
GRASS GATHERER.
APPLICATION FILED APR. 11, 1906.
3 SHEETS—SHEET 3.
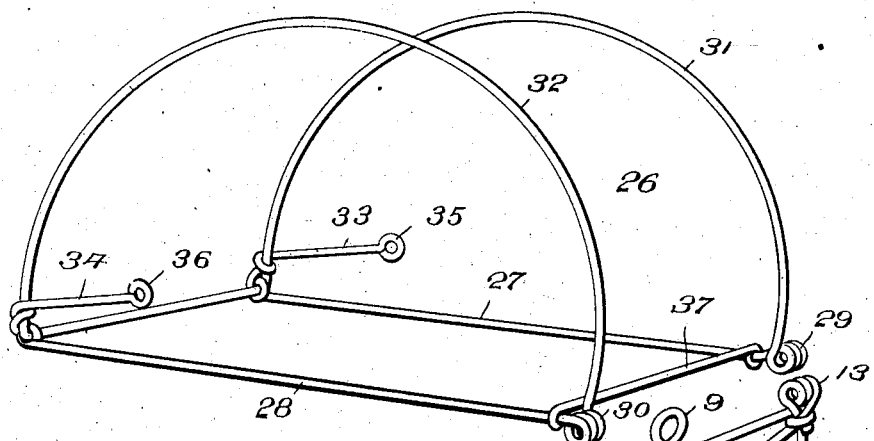
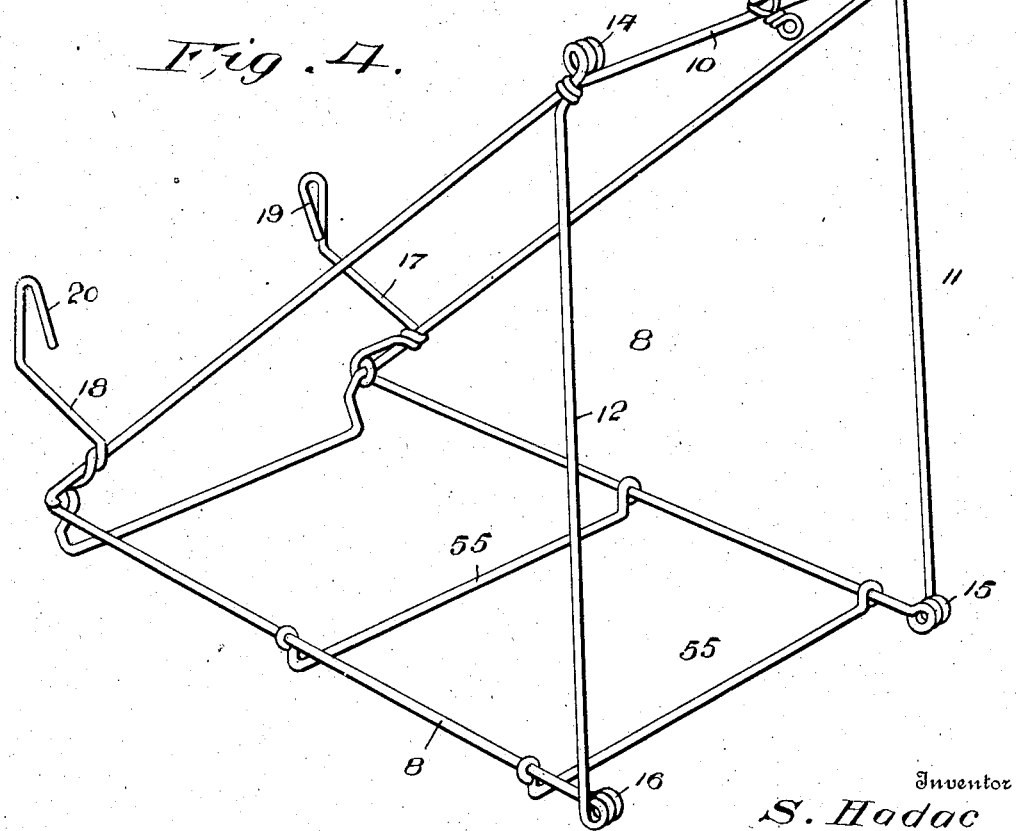
Witnesses
Inventor
S. Hadac
By W. J. FitzGerald & Co.
Attorneys

UNITED STATES PATENT OFFICE.

STEPHEN HADAC, OF ELY, IOWA.

GRASS-GATHERER.

No. 834,615.  Specification of Letters Patent.  Patented Oct. 30, 1906.

Application filed April 11, 1906. Serial No. 311,114.

*To all whom it may concern:*

Be it known that I, STEPHEN HADAC, a citizen of the United States, residing at Ely, in the county of Linn and State of Iowa, have invented certain new and useful Improvements in Grass-Gatherers; and I do hereby declare the following to be a full, clear, and exact description of the invention, such as will enable others skilled in the art to which it appertains to make and use the same.

My invention relates to new and useful improvements in grass-gatherers, and more particularly to that class adapted to be used in connection with lawn-mowers to gather the grass as it is mown.

My object is to provide a device which will gather the grass as it is being cut and retain the same until such a time as it is desired to deposit the same in a pile.

A further object is to provide means for operating the several parts of my device whereby all the grass in the gatherer can be dumped out at one operation.

A further object is to provide means for readily attaching or detaching the device to a lawn-mower.

A still further object is to provide means for restoring the gatherer to its normal position after the grass has been dumped therefrom.

Other objects and advantages will be hereinafter made clearly apparent, and pointed out in the claims.

In the accompanying drawings, which are made a part of this application, I have shown the preferred form of my invention.

In said drawings, Figure 1 is a perspective view of my improved gatherer as applied to use upon the controlling-handle of a lawn-mower. Fig. 2 is a sectional view therethrough. Fig. 3 is a perspective view of a part of the gatherer-frame. Fig. 4 is a perspective view of the supporting-frame for my improved gatherer. Fig. 5 is a detail side elevation of a portion of the mower-handle, showing means thereon for securing the grass-gatherer thereto; and Fig. 6 is a detail perspective view of a portion of the securing member shown in Fig. 5 of the drawings.

Referring to the figures by numerals of reference, 1 indicates the controlling-handle for a lawn-mower, said handle being provided with a cross-head 2 at its upper end and arms 3 at its lower end, by which means the handle 1 is secured to a lawn-mower, the mower not being shown, as it forms no part of my invention. A locking member 4 is secured to the under side of the handle 1 in any preferred way, said member carrying a latch 5 at one end thereof and a ring 6 at its opposite end, said latch being provided with a curved end 7, which is adapted to take into the ring 6, and thereby held in a locked position. A supporting-frame 8 is secured to the locking member 4 by means of the latch 5 extending through a loop 9 in the frame 8, said loop being formed in the cross-bar 10 at the upper end of said frame, said cross-bar being secured at its opposite ends to the triangularly-disposed members 11 and 12, said members 11 and 12 being constructed of one continuous piece of wire and are so bent at divers points as to form loops 13 and 14, respectively, and 15 and 16, respectively, for a purpose to be hereinafter set forth. The free ends 17 and 18, respectively, of the members 11 and 12 are extended outwardly and terminate in hooked ends 19 and 20, respectively, said hooked terminals being designed to engage the arms 3, as best shown in Fig. 1 of the drawings.

It will thus be seen that the frame 8 can be readily and quickly secured to the handle portions of a lawn-mower and securely held in place thereon. A rod 21 is disposed through the loops 13 and 14, said rod being provided with a head 22 at one end and a nut 23 at its opposite end, so that when said rod is disposed through said loops it will be retained in position therein by means of the nut 23. A similar rod 24 is directed through the loops 15 and 16 and is secured therein by means of a nut 25. Pivotally secured to the rod 24 is a tilting frame 26, said frame also being formed of one continuous piece of wire, said frame comprising the parallel straight sections 27 and 28, said sections being twisted at one end to form looped members 29 and 30, through which takes the rod 24, and by which means said frame is pivotally secured to the frame 8. Side railings 31 and 32 are formed by extending a portion of the wire forming the frame in a semicircular form from one end of the side sections 27 and 28, respectively, to the opposite ends thereof, the free ends 33 and 34, respectively, of the side sections 27 and 28 being disposed around portions of one end of the railings 31 and 32 and are provided at their extreme outer ends with eyes 35 and 36, respectively. The looped ends of the sections 27 and 28 are reinforced by means of a cross-bar 37, as best shown in Fig. 3 of the drawings. The frame 26 is provided with a suitable floor-section 38, said section being preferably composed of woven wire or the like, said woven material being disposed over a frame 39, which is secured in any preferred way to the straight sections 27 and 28 of the frame 26, the floor-section 38 being provided with a suitable covering of any preferred material, such as oil-cloth or the like, and the railings 31 and 32 are covered with similar material 41, thereby providing a receptacle for the reception of the grass as it is cut by the lown-mower.

To retain the grass upon the frame 26 and prevent the same from moving off the rear end thereof, I have provided a swinging closure 42, said closure comprising a suitable wire frame having upwardly-extending arms 43, said arms having looped sections 44 at their upper ends through which takes the rod 21 and upon which said closure 42 swings. The frame of the closure 42 is covered with suitable material 45, said material being similar to that used in covering the frame 26. When the closure 42 is lowered or in its normally closed position, the end sections thereof are extended into engagement with the outer surface of the railings of the grass-receptacle or tilting frame, thereby lending rigidity to the railings and compensating for any outward pressure caused by the weight of the accumulated grass in the receptacle. The cross-bar 10 is provided with an additional looped section 46, to which is secured one end of a lifting-arm 47, to the opposite end of which is secured a bar 48, the opposite end of which is in turn secured to a crank-operating lever 49, the crank portion of said lever being rotatably mounted upon the handle 1 in juxtaposition to the cross-bar 2, said crank-arm being provided with a suitable operating-handle 50. A link 51 is disposed between the lower end of the lifting-arm 47 and the closure 42, thereby placing the closure 42 under control of the crank-arm 49.

When a sufficient amount of grass has been deposited in the receiving-frame 26 and it is desired to discharge the same, the operator grasps the handle 50 and raises upwardly thereon, the crank-arm 49 through the medium of the bar 48 and link 51 elevating the closure 42, thereby causing the frame 26 to tilt rearwardly through the medium of latches 52, said latches being secured at one end in the eyes 35 and 36 and the opposite ends thereof hooked into similar eyes 53, carried by the closure-frame 42, and by which means the closure 42 and frame 26 are operatively secured together. After the contents of the frame 26 have been dumped therefrom the frame and closure are returned to their normal operative position by means of spring members 54, said spring members being directed around the rod 24 and having one of their ends secured to the frame 8 and the opposite ends thereof to the floor-section 39.

As best shown in Fig. 4 of the drawings, the side sections of the frame 8 are reinforced and made rigid by means of cross-bars 55, said bars being so constructed that they will extend below the floor-section of the frame 26.

What I claim is—

1. In a grass-gatherer of the class described, the combination with the handle of a lawn-mower having arms at one end and a cross-head at the opposite end; of a grass-gatherer comprising a stationary frame, having looped sections at the upper end and cross-bars, one of said bars having a loop, means adapted to engage said loop to secure said frame to said handle, a gathering-frame having curved side walls pivotally mounted upon said stationary frame, a closure also movably secured to said stationary frame, and means to operate said closure and gathering-frame whereby the contents thereof will be discharged therefrom.

2. The herein-described grass-gatherer comprising a stationary frame, a receiving-frame pivotally mounted thereon, a movable closure carried by said receiving-frame and adapted to normally rest at one end of the grass-receptacle, latch members carried by said grass-receptacle and disposed in engagement with the closure, means to elevate said closure whereby the grass-receptacle will be tilted and the contents thereof discharged therefrom, and means to secure said receptacle to the handle of a lawn-mower.

3. A grass-gatherer of the class described comprising a stationary frame, means thereon to secure the same to a mower, a tilting frame secured to said stationary frame, a floor-section for said frame, a closure for one end of said tilting frame, latch members to secure said tilting frame and closure together, and means to simultaneously elevate said closure and tilting frame whereby the contents of said tilting frame will be discharged.

4. A grass-receptacle of the class described comprising a stationary frame, a tilting frame, railings on said tilting frame, a curved closure at one end of said tilting frame, end sections on said closure adapted to engage the outer edges of said railings when said closure is in its normally closed position, means to operatively connect said closure and tilting frame, and additional means to elevate the closure whereby the contents of the tilting frame will be discharged.

5. In a grass-gatherer, the combination with a stationary frame; of a tilting frame pivotally secured thereto, said tilting frame having floor and side sections, a closure for one end of said tilting frame pivotally secured to said stationary frame, eyes on said closure, latches secured to the front end of the tilting frame for engagement with said eyes, whereby the said tilting frame and closure will be caused to operate in unison, a crank-arm and connections adapted to lift the closure and tilting frame and means to automatically return said closure and tilting frame to their normal positions.

In testimony whereof I have signed my name to this specification in the presence of two subscribing witnesses.

STEPHEN HADAC.

Witnesses:
ADOLPH HAVLICEK,
GEORGE L. BENESH.